United States Patent
Cheng (10) Patent No.: US 9,454,574 B2
(45) Date of Patent: Sep. 27, 2016

(54) BLOOM FILTER COSTING ESTIMATION

(71) Applicant: Xun Cheng, Dublin, CA (US)

(72) Inventor: Xun Cheng, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 246 days.

(21) Appl. No.: 14/229,211

(22) Filed: Mar. 28, 2014

(65) Prior Publication Data

US 2015/0278306 A1  Oct. 1, 2015

(51) Int. Cl.
*G06F 17/30* (2006.01)

(52) U.S. Cl.
CPC .............. *G06F 17/30469* (2013.01)

(58) Field of Classification Search
CPC .............................. G06F 17/30466
See application file for complete search history.

(56) References Cited

U.S. PATENT DOCUMENTS

| | | |
|---|---|---|
| 7,925,656 B2 | 4/2011 | Liu et al. |
| 7,958,114 B2 | 6/2011 | Chaudhuri et al. |
| 8,005,868 B2 | 8/2011 | Saborit et al. |
| 8,271,478 B2 | 9/2012 | Hill et al. |
| 8,526,603 B2 | 9/2013 | Kerschbaum |
| 8,666,989 B1 | 3/2014 | Gilliam et al. |
| 2008/0082628 A1 | 4/2008 | Rowstron et al. |
| 2008/0147599 A1* | 6/2008 | Young-Lai ........ G06F 17/30445 |
| 2010/0082648 A1 | 4/2010 | Potapov et al. |
| 2011/0082854 A1* | 4/2011 | Eidson ............. G06F 17/30463 707/714 |
| 2012/0084287 A1 | 4/2012 | Lakshminarayan et al. |
| 2012/0109888 A1 | 5/2012 | Zhang et al. |
| 2012/0310916 A1 | 12/2012 | Abadi et al. |
| 2013/0166554 A1 | 6/2013 | Yoon et al. |
| 2013/0166557 A1 | 6/2013 | Fricke et al. |
| 2013/0166576 A1 | 6/2013 | Hudzia et al. |
| 2014/0036925 A1 | 2/2014 | Hui et al. |

OTHER PUBLICATIONS

"Optimizing Distributed Joins with Bloom Filters", Sukriti et al., Research Center L3S, Leibniz University Hannover, Jul. 10, 2008.*

* cited by examiner

*Primary Examiner* — Apu Mofiz
*Assistant Examiner* — Cindy Nguyen
(74) *Attorney, Agent, or Firm* — Sterne, Kessler, Goldstein & Fox P.L.L.C.

(57) ABSTRACT

Bloom filter cost estimation engine for improved performance and accuracy is described. An example method includes building an execution plan for a join operation having a plurality of levels, where the execution plan includes a top join operator at a top level, a leaf scan operator on a bottom level, and one or more intermediate operators between the top level and the bottom level. A row reduction effect of applying a Bloom filter is determined by simulating a semi-join operation over table statistic representation at each of the plurality of levels of the execution plan. A cost savings of the join operation is calculated based on the row reduction effect at the each of the plurality of the levels.

20 Claims, 5 Drawing Sheets

BLOOM FILTER COSTING ESTIMATION

BACKGROUND

1. Field

Disclosed embodiments generally relate to execution plans in relational databases.

2. Background Discussion

In database query processing, join operations are regularly used in order to combine fields from tables, using values common to each, in order to create a new set of data. The cost for a join operation is often expensive, particularly for joins of large tables. When processing query operations on a database, a database management system will seek to execute the queries as efficiently as possible. Determining an efficient execution approach, typically referred to as a query execution plan, is handled by a query optimizer.

Some conventional query optimizers attempt to manage the cost of join operations by mitigating the size of the working set. For example, some query optimizers use a Bloom filter, which is a space-efficient probabilistic data structure to support membership queries and to test whether an element is a member of a given set. The Bloom filter allows pruning of the rows of the table that fail the join criteria during a table scan phase, thereby generally avoid excessive input/output (I/O) and temporary space overhead. The Bloom filter can therefore improve performance in the join processing and optimization by reducing the number of rows (i.e., the cardinality) of the scan result before execution of the join operation. Since the efficiency from the reduction of the scan result cardinality can outweigh the extra processing costs, the query optimizer may integrate the Bloom filter into the query execution in order to achieve overall efficiencies.

Conventional systems typically use a bottom-up approach to estimate the cost of applying the Bloom filter to a multiple join plan. In this approach, the effect of the Bloom filter is first estimated at the scan operator level based on a partial statistics of the join, and the estimation at the scan level is used to further estimate the cost of the join in the upper level above the scan level, and so forth. However, this bottom-up approach may lead to great inaccuracy. The problem is exacerbated due to the possibility that a small estimation error at the scan level may be accumulated and amplified through multiple join levels. As a result, conventional systems generally fail to provide an accurate cost estimation model for the Bloom filter.

Accordingly, conventional systems do not process queries of join operations with ideal performance and accuracy, especially when the operations involve multi-level joins on large tables.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

The accompanying drawings, which are incorporated herein and form part of the specification, illustrate the embodiments of the present invention and, together with the description, further serve to explain the principles of embodiments and to enable a person skilled in the relevant art(s) to make and use such embodiments.

DETAILED DESCRIPTION

Provided herein are system, method and/or computer program product embodiments, and/or combinations and sub-combinations thereof, for a Bloom filter estimation engine. As will be described in further detail below, embodiments can simulate a semi join operation at the leaf level to obtain partial statistics of a join (or "join operation"). Embodiments can further simulate a fresh semi-join at each upper level of the join, which is independent of the cost estimation error that may occur at the leaf level or any other lower level. This approach avoids the accumulation or amplification of the estimation error generated at the leaf level across upper levels of the join, providing improved performance and accuracy for query optimization of multiple join operations using the Bloom filter.

Figure 1:
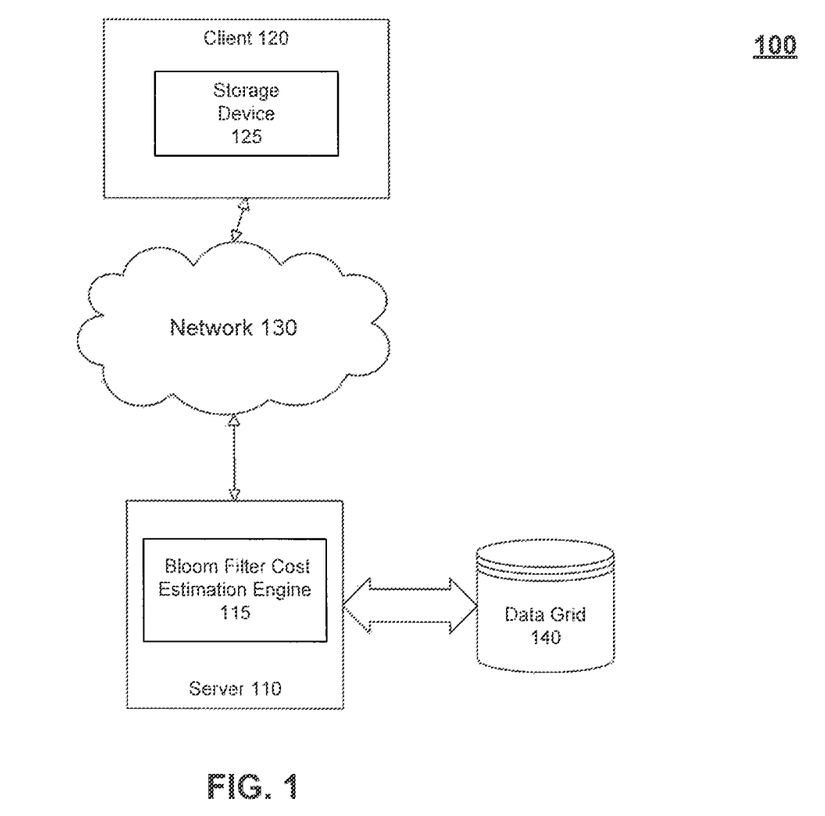
FIG. 1 illustrates a client/server system, according to an embodiment.

FIG. 1 illustrates a client/server system 100. System 100 includes a server 110, a BFCEE 115, a client 120, a network 130, and a data grid or distributed database 140.

Client 120 communicates with server 110 over the network 130. Specifically, client 120 may be connected to a Database Management System (DBMS) (not shown) on server 110 via network 130. In an embodiment, the DBMS operates as an independent process (i.e., independently of the clients), running under a server operating system such as Microsoft® Windows NT, Windows 2000, Windows XP, Windows Vista and Windows 7 (all from Microsoft Corporation of Redmond, Wash.), UNIX (Novell), Solaris (Sun), or Linux (Red Hat), by way of non-limiting example.

The client 120 includes functionality for packaging client calls in Structured Query Language (SQL) together with any parameter information into a format (of one or more packets) suitable for transmission to the DBMS over network 130. Client 120 may send SQL statement to server 110 and receive query results from server 110. Although only one server 110 is shown, more servers may be used. Network 130 may be any network or combination of wired and wireless networks that carry data communication. Such network can include, but is not limited to, a local area network, medium area network, and/or wide area network such as the Internet. The DBMS executing on server 110 interfaces with data grid 140 in order to obtain data used to respond to queries.

Figure 5:
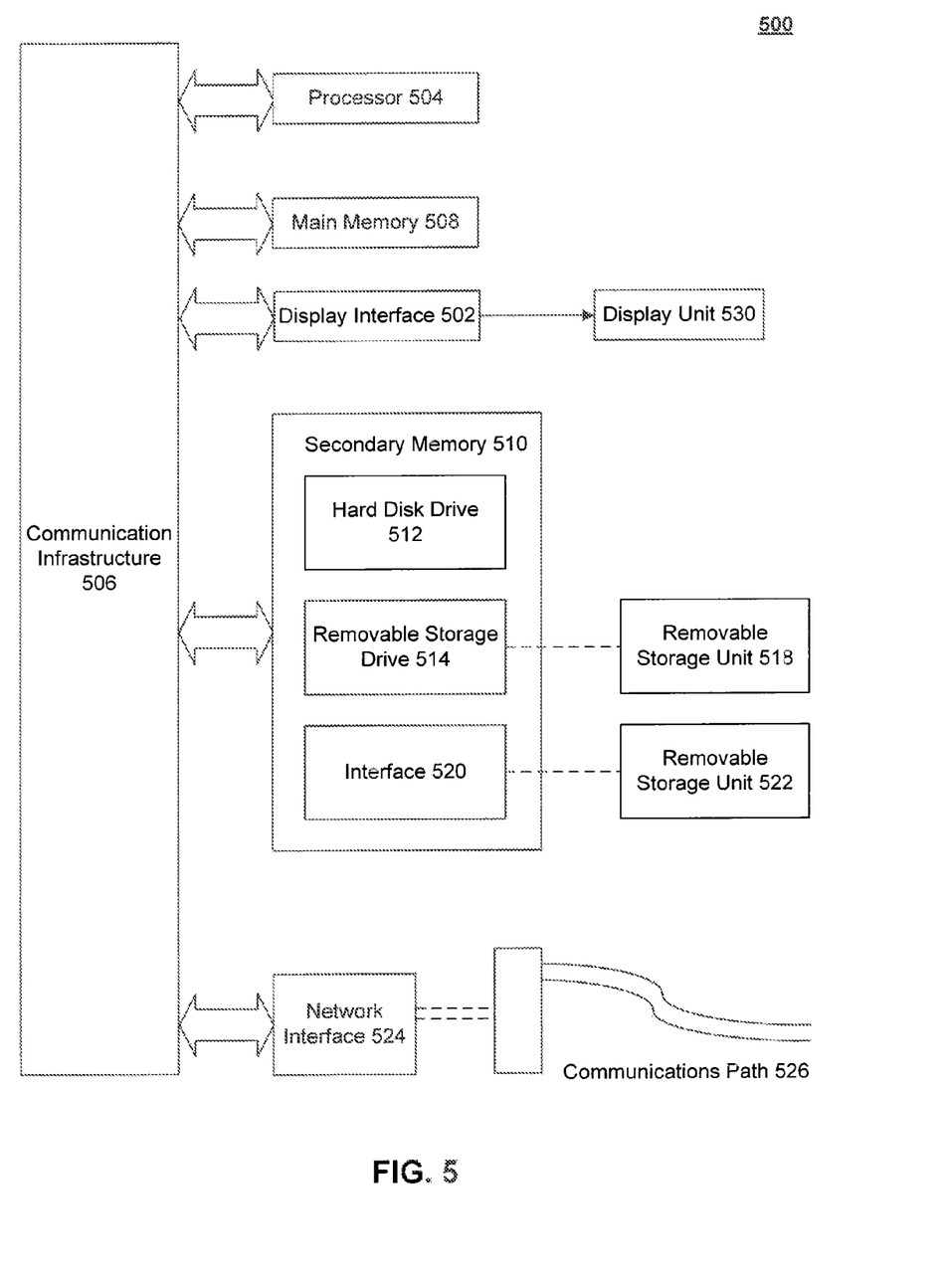
FIG. 5 is a diagram of an example computer system in which embodiments can be implemented.

Client 120 can be any conventional computing system, such as the system shown in FIG. 5, including a storage device 125 for running client-side software dependent on data stored in database 140, in accordance with an embodiment. Although only one client 120 is shown, more clients may be used as necessary. Server 110 may also be a conventional computing system such as shown in FIG. 5. In a further embodiment, client 120 and server 110 can be implemented on a same computing system, and communicate using internal communication protocols rather than via network 130.

Server 110 can host BFCEE 115. As illustrated in FIG. 1, client 120 can send data requests to server 110, which can in turn invoke BFCEE 115 for further processing, BFCEE 115 can be software, firmware, or hardware or any combination thereof in a computing device. Invocation of BFCEE may be handled by the DBMS executing on server 110, or by a component thereof, such as a query optimizer of the DBMS.

Figure 2:
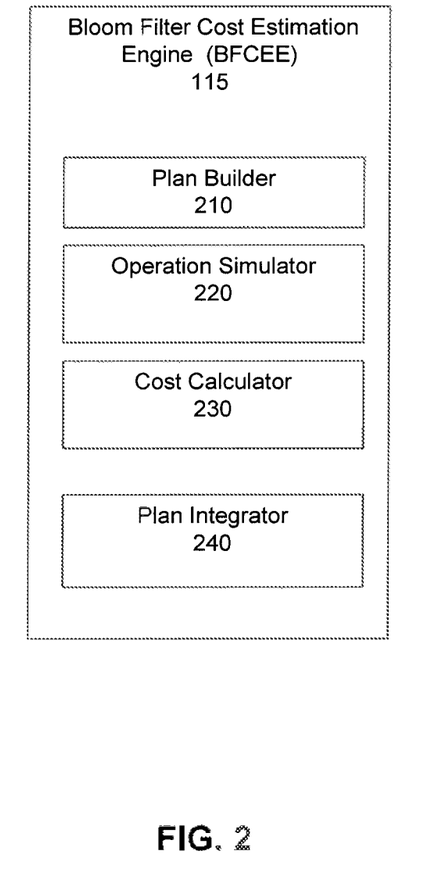
FIG. 2 illustrates elements of a Bloom filter cost estimation engine (BFCEE), according to an embodiment.

FIG. 2 illustrates elements of a BFCEE, according to an embodiment. In the example shown in FIG. 2, BFCEE 115 includes plan builder 210, operation simulator 220, cost calculator 230, and plan integrator 240.

Plan builder 210 builds a query execution plan (or "execution plan") for the join operation. The execution plan specifies a series of steps that, if performed, will gather the necessary data and provide a result for a query. For example, in the case of the join operation, the execution plan can specify an approach for gathering data from tables being joined (scanning) and comparing an index used as a comparison between the tables.

In an embodiment, the execution plan is structured to have multiple levels. These levels correspond to levels of an execution plan tree. Specifically, the execution plan can be visualized as a tree, such that nodes of the tree correspond to individual operations that are required in order to complete the execution plan. The leaves of the tree perform basic I/O operations (e.g., a scan, or a "leaf scan operator"), and the data propagates up the tree to the next level. In the case of a join operation, the representative node would have two children corresponding to, for example, the two tables that are read into memory for joining.

In the example execution plans discussed herein, the execution plan may include a root join operator at a top level, a leaf scan operator on a bottom level, and one or more intermediate operators between the top level and the bottom level. One skilled in the relevant arts will recognize that the root join operator, representative of a join operation, need not be at the root of the entire execution plan tree, but can be a parent node located at a top level relative to the intermediate operators and the bottom level leaf scan operator.

In an embodiment, plan builder 210 can apply a Bloom filter in order to execute a join operation in query processing. Applying the Bloom filter as part of the execution plan may allow earlier filtering of rows from scan of the table before the actual join executes, thereby potentially reducing the cost of performing the join. In the event that the Bloom filter is able to eliminate a significant percentage of rows, specifically those rows that the join operation would discard as unneeded anyway (i.e., the rows do not satisfy an equi-join condition), it is possible to save processing costs. An equi-join may be a join operation based on an equality condition. The reduced cardinality of the data set may further cut down costs incurred by intermediate join operations located at the intermediate levels.

A pushdown Bloom filter is a specific technique that a plan builder 210 can use for applying the Bloom filter to a join, in accordance with an embodiment. The join is divided into two "sides" (child nodes) in the execution plan. One side of the join (referred to as the "build" side) builds a derived table using a bit vector (or a bitmap, or other representation understood by those skilled in the relevant art) representing qualifying join keys. Specifically, key values used as the basis for the join are hashed to a location in the bit vector. If any key value maps to that location, the location bit is set to indicate such (e.g., the bit is set to '1' to indicate that at least one join key exist that maps to that location). On the other side (referred to as "probe" side), the resulting populated bit vector is used to filter out rows. The Bloom filter's build operator (i.e., the "build" side node) allocates the bit vector memory for the Bloom filter at runtime and sets the corresponding bits in the bit vector. The build operator may be, by way of non-limiting example a hash join used to compare values from one table with values from another table. The Bloom filter's probe operator (i.e., the "probe" side node) utilizes the bit vector to filter out rows. For example, the Bloom filter probe operators may be a table/index scan operator, which reads the raw table data from disk, but relies on the bit vector to limit the data being read to only the rows with the corresponding join key value.

Operation simulator 220 determines a row reduction effect of applying the Bloom filter to corresponding operator by simulating a semi join operation over a table statistic representation at each of the plurality of levels of the execution plan. The table statistic representation includes a histogram of data distribution variables on a table involved in the join operation. The table statistic representation may further include row count variables associated with the table. A semi-join returns rows from one table that is to be joined with another table without performing a complete join. The left semi join logical operator returns each row from the first (top) input when there is a matching row in the second (bottom) input. The row reduction effect may affect the overall cost benefit analysis in evaluating the effect of the Bloom filter to the query performance. One skilled in the relevant arts will recognize that costs associated with query performance can be measured by a number of techniques, and can be adjusted in testing in order to control for certain behaviors (e.g., by specifying that access to disk should be treated as high-cost). Accordingly, discussion of "cost" herein is relative to a non-specific cost approach that represents computational work and inefficiencies thereof, whereby certain operations can act to increase or decrease an overall cost. A further discussion of cost approaches is provided below with regard to cost calculator 230.

According to an embodiment, operation simulator 220 estimates the row reduction effect of applying the Bloom filter at each level of the execution plan. For example, the Bloom filter's ability to reduce the cardinality of the rows is obtained by applying the Bloom filter to the leaf scan operator at the bottom level of the execution plan. Alternatively, the Bloom filter's ability to reduce the cardinality of the rows is obtained by applying the Bloom filter to one or more intermediate operators at the intermediate levels of the execution plan. Still alternatively, the Bloom filter's ability to reduce the cardinality of the rows is obtained by applying the Bloom filter to the top join operator at the top level of the execution plan.

Specifically, the row reduction effect of applying the Bloom filter at each level of the execution plan is obtained by simulating a semi join operation over a table statistic representation at each level, In an embodiment, a semi-join operation is simulated between the table statistic representation at each level and a build side of an original derived table. For example, a semi-join operation is simulated between the histogram and row count variables at the bottom level, and the build side of an original derived table involved in the join operation. The histogram may be a statistic representation of data distribution of the table at the bottom level, which serves as a virtual table to be semi-joined with the build side of an original derived table. The build side of an original derived table may be a histogram generated from the build side, which may be a constant histogram. Thus, the semi-join operation may be performed between two histograms or virtual tables. In an embodiment, a new table statistic representation is generated at each level of the execution plan based on the corresponding data distribution variables and the row count variables, as the Bloom filter travels from the bottom level to the top level, and the Bloom filter is applied to the corresponding operator at each level.

Cost calculator 230 calculates cost savings of the join operation based on the row reduction effect at the each of the plurality of levels. In one embodiment, operation simulator 220 travels down from the top join operator to each each intermediate operator at the probe side recursively, then to the leaf scan operator. The probe operator may include the corresponding operators at each level, such as the top join operator, the intermediate operator and the leaf scan operator. The probe operator may call the appropriate object to get statistics of the partial join in applying the Bloom filter at each intermediate level, and to the leaf scan operator at the bottom level. Operation simulator 220 may simulate a left semi-join between the probe (the outer side) and the build input stream (the inner side). By performing these calculations, it is possible for the BFCEE to determine whether the execution plan will realize any cost savings by utilizing the Bloom filter, as described in further detail below with regard to plan integrator 240.

In one embodiment, cost calculator 230 calculates the cost savings of the join operations at all levels of the execution plan based on the additional or fresh semi-join simulation conducted at each level by operation simulator 220.

In one embodiment, cost calculator 230 accounts for false positives in the cardinality reduction effect (i.e., the row count reduction) of the Bloom filter. By way of non-limiting example, the cost calculator adds a 3% false positive rate to the cardinality reduction at each level of the execution plan. For example, the row count obtained via semi-join simulation may be further increased by 3%.

In one embodiment, to estimate the row count reduction to each probe operator, operation simulator 220 simulates a semi-join operation between the table statistic representation at each level and the histogram from the build side of an original derived table; and cost calculator 230 adds a 3% false positive rate to the reduced row count. Any operator in-between (from the pushdown join at the top level to the probing scan at the leaf level) may be re-costed based on the new estimates on the new semi-join operations at each level.

This is in contrast with the traditional naïve bottom-up approach that just re-computes the join histogram based on new cost estimates from the leaf level. In the naïve approach, when the probe operator has certain estimation error (unavoidable due to the probabilistic property of the Bloom filter), the error may be quickly propagated up through the join re-costing process as it moves up each level and the error may be further amplified by the process. Accordingly, making the decision to use a Bloom filter in the execution plan based on the recosting result is potentially unreliable and may lead to a sub-optimal execution plan. In contrast to conventional solutions, embodiments re-apply the row count reduction semi-join simulation to in-between operators at intermediate levels, assuming the possibility that the operator captures the Bloom filter without being further pushed down. Embodiments lead to a new join histogram with a new estimated row count which may be used by the parent operator (i.e., the parent node located at the top level) for re-calculating the cost of the Bloom filter.

Plan integrator 240 integrates the Bloom filter to the execution plan upon determination that cost saving of applying the Bloom filter to the join operation exceeds a joint cost of applying the Bloom filter to the join operation. In an embodiment, the joint cost of applying the Bloom filter is calculated based on a cost associated with build side and probe side of the Bloom filter.

In one embodiment, plan integrator 240 checks whether the final reduced row count for all levels of the join operation is less than a certain amount of the original row count. By way of non-limiting example, plan integrator 240 checks whether the final reduced row count for all levels of the join operation is less than 90% of original row count. If not, plan integrator 240 may consider the Bloom filter to be less preferable than performing the execution plan without its use, and removes the Bloom filter from the execution plan. In an embodiment, the recosting of the execution plan for the join operation may not be triggered unless at least one probe operator achieves that goal of reducing the row count to a certain amount In an embodiment, an execution plan may contain several sub trees each having a leaf operator and the Bloom filter may be pushed down to these leaf operators. Plan integrator 240 checks whether the final probing reduced row count at each leaf operator is less than a certain amount of the original row count. The recost using the Bloom filter is not triggered unless the row reduction effect of at least one of the leaf operator meets the desirable threshold.

In an embodiment, costing savings comparison with a cost savings threshold may occur at the top level. The row reduction effect may be compared at each level with a row reduction threshold. The row reduction effect of the top join operator is the row reduction effect at the top level plus the collective effect occurring at all its child operators.

In an embodiment, plan integrator 240 discards the Bloom filter from the execution plan upon determination that the cost savings of applying the Bloom filter to the join operation does not exceed a joint cost, where the joint cost is based on a cost associated with build side and probe side of the Bloom filter. For example, if it is not worthwhile to apply the Bloom filter to the original join operator, plan integrator 240 removes the Bloom filter from the candidate probe operator. In an embodiment, in order to reduce the recosting complexity, all other Bloom filters originating from any parent join from the same candidate probe operator may also be removed, which avoids the situation of having to go back to the candidate probe operator to do another round of recosting for any operator above the current probing level in the execution plan A person of ordinary skill in the art would recognize the 3% and 90% threshold values noted above are for illustration, not for limitation purpose. Other threshold values may be applied by BFCEE 115.

Embodiments of the elements of client component of BFCEE 115 in FIG. 2, as described herein, may run in parallel for connections between different sets of clients and database server instances. Such parallel execution of these elements would increase the efficiency and speed of system 100.

Figure 3:
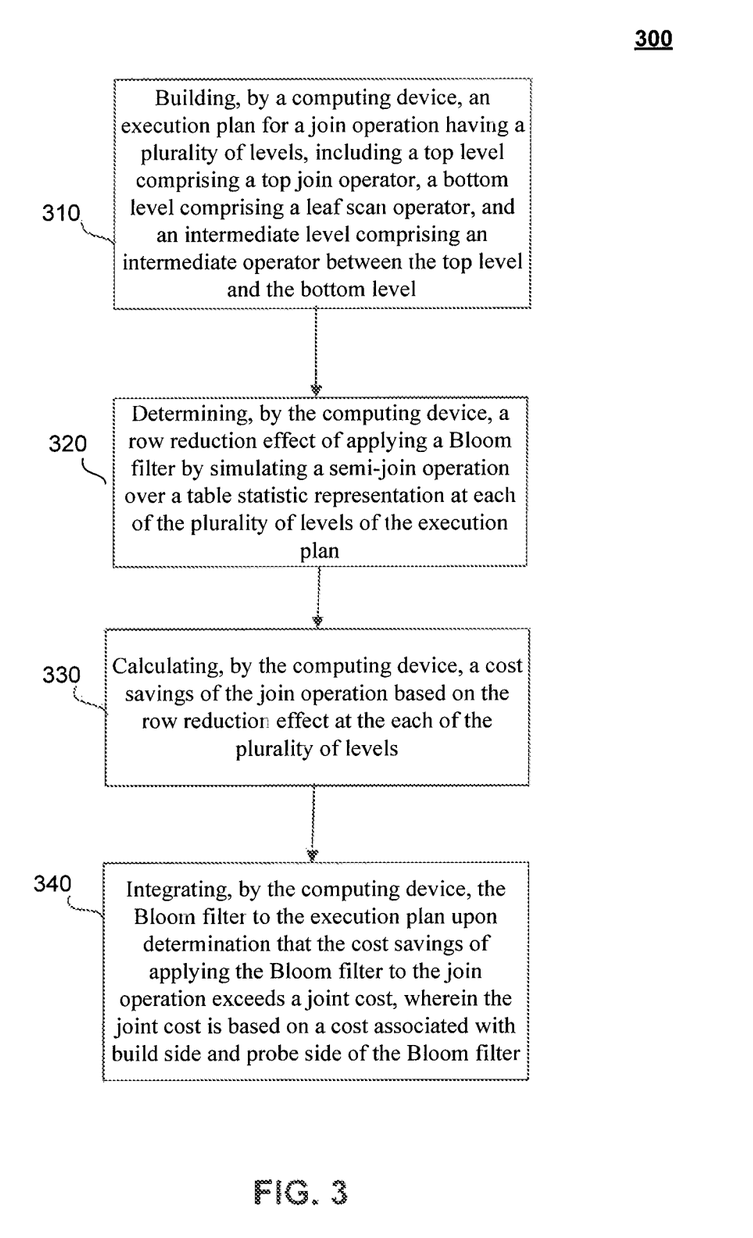
FIG. 3 is a flowchart for a method for Bloom filter cost estimation, according to an embodiment.

FIG. 3 is a flowchart for a method 300 for Bloom filter cost estimation, according to an embodiment. Method 300 can be performed by processing logic that can comprise hardware (e.g., circuitry, dedicated logic, programmable logic, microcode, etc.), software (e.g., instructions run on a processing device), or a combination thereof. In one implementation, the method 300 is performed by BFCEE 155 in server 110 of FIG. 1 and/or the BFCEE 155 of FIG. 2, as described above.

At stage 310, the BFCEE builds an execution plan for a join operation, such that the execution plan has multiple levels. The execution plan includes a top join operator at a top level, a leaf scan operator on a bottom level, and intermediate operators between the top level and the bottom level. For example, plan builder 210 builds an execution plan for the join operation.

At stage 320, the BFCEE determines a row reduction effect of applying the Bloom filter to corresponding probe operator by simulating a semi-join operation over table statistic representation at each of the plurality of levels of the execution. For example, operation simulator 220 simulates a semi-join operation at the bottom level to estimate the row reduction effect of applying the Bloom filter to the leaf scan operator. In one embodiment, operation simulator 220 simulates a semi-join operation at each level above the leaf scan operator to estimate the row reduction effect of applying the Bloom filter to each level.

At stage 330, the BFCEE calculates a cost savings of the join operation based on the row reduction effect at the each of the plurality of levels. For example, cost calculator 230 calculates the cost savings of the join operation based on the row reduction effect at each level. In one embodiment, the cost savings of the join operation at each level of the join operation is calculated based on simulating a semi-join operation over table statistic representation at the each level. In another embodiment, a false positive rate (e.g., a 3% false positive rate) is added to the reduced row count obtained by the simulation of semi-join operation at each level of the join operation.

At stage 340, the BFCEE integrates the Bloom filter into the execution plan upon determination that a cost savings of applying the Bloom filter to the join operation exceeds a joint cost of applying the Bloom filter to the join operation, and the joint cost of applying the Bloom filter is calculated based on a cost associated with build side and probe side of the Bloom filter. For example, plan integrator 240 integrates the Bloom filter into the execution plan upon determination that a cost savings of applying the Bloom filter to the join operation exceeds a joint cost of applying the Bloom filter to the join operation.

Figure 4:
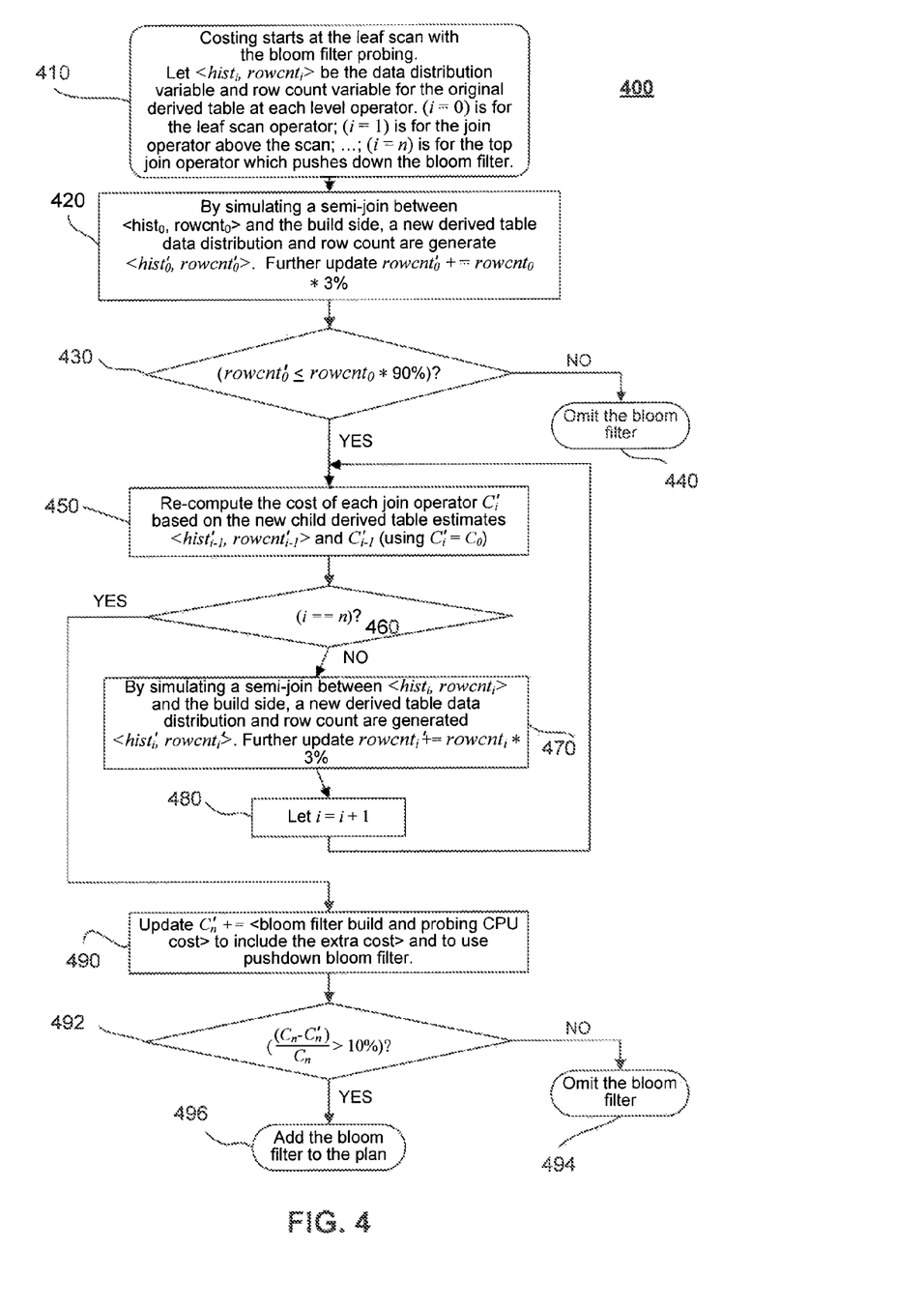
FIG. 4 is a flowchart for a Bloom filter cost estimation, according to another embodiment.

FIG. 4 is a flowchart for a method for Bloom filter cost estimation, according to another embodiment. Method 400 can be performed by processing logic that can comprise hardware (e.g., circuitry, dedicated logic, programmable logic, microcode, etc.), software (e.g., instructions run on a processing device), or a combination thereof. In one implementation, the method 400 is performed by BFCEE 155 in server 110 of FIG. 1 and/or the BFCEE 155 of FIG. 2, as described above. As illustrated in this example, at stage 410, the BFCEE initiates the costing estimation process for applying the Bloom filter at the leaf scan operator of the bottom level of the join operation. In an embodiment, <$hist_i$, $rowcnt_i$> represents histograms of the data distribution variables and row count variables for the original derived table involved in the join operation at each level of the execution plan. The subscript i represents a number that corresponds to a level in the join operator. As used herein, (i=0) refers to the leaf scan operator on the bottom level, (i=1) refers to an operator (e.g., a join operator) located above the leaf scan, and so on. Furthermore, (i=n) is used to refer to the top join operator at the top level (e.g., the root of the execution plan, or a parent operator for a subset of the execution plan) that pushes down the Bloom filter.

At stage 420, by simulating a semi-join between the table statistic representation (such as, data distribution variable and row count variable) <$hist_0$, $rowcnt_0$> at the leaf scan operator and the build side, the BFCEE generates a new table statistic representation (new table data distribution and a new row count) as <$hist'_0$, $rowcnt'_0$>. For example, step 420 may correspond to step 320 in FIG. 3. In an embodiment, a 3% false positive rate may be incorporated to calculate and update the row count at the leaf scan operator as $rowcnt'_0 += rowcnt_0 * 3\%$.

At stage 430, the BFCEE tests whether the reduced row count with the boom filter applied at the leaf scan operator is equal or less than, for example, 90% of the original row count on the original derived table according to an embodiment. If the test fails, and the cost saving effect of applying the boom filter does not meets the threshold, the process proceeds to stage 440, where the Bloom filter is omitted from the final execution plan.

In the event that the test at stage 430 is successful and the process proceeds to stage 450, where the cost savings of each join operator $C'_i$ is recalculated based on the new child derived table estimates <$hist'_{i-1}$, $rowcnt'_{i-1}$> which is generated at stage 420, and $C'_{i-1}$ (using $C'_0 = C_0$), the cost savings based on the row reduction effect obtained at a lower level. In an embodiment, a fresh new semi join is simulated at each level. For example, stage 450 may correspond to stage 330 in FIG. 3, At stage 460, the BFCEE determines whether the cost estimation process has traversed all levels of the execution plan for the join operation, if not, the process proceeds to step 470, where the BFCEE simulates a semi-join between <$hist_i$, $rowcnt_i$> and the build side, and a new table data distribution and a new row count are generated as <$hist'_i$, $rowcnt'_i$>. Further, similar to step 420, the row count variable may be updated as $rowcnt'_i += rowcnt_i * 3\%$, to indicate an addition of a 3% false positive rate. In stage 480, the level counter of the join operation is updated as i=i+1 and process returns to stage 450, where the cost of the join operator at the next level is calculated and so forth.

If the process passes the test at stage 460 and the process has traversed all levels of the join operation, the process proceeds to stage 490, where the BFCEE updates the total cost of the Bloom filter as $C'_n +=$<the cost associated with the build and probe side of the Bloom filter> to include the extra cost to use pushdown Bloom filter.

At stage 492, the BFCEE determines whether the cost saving incurred by the application of the Bloom filter exceeds a threshold. For example, the BFCEE can determine whether the cost saving exceeds 10% of the original cost, represented as $$\left( \frac{(c_n - c'_n)}{c_n} > 10\% \right),$$

with Cn representing the cost of the join operation without the application of the Bloom filter and Cn' representing the cost of join operation with the Bloom filter. As noted, the cost savings may be calculated based on the row reduction effect obtained at each level. If so, the process proceeds to stage 496, where the Bloom filter is integrated into the final execution plan of the join operation. Otherwise, the process proceeds to stage 494, where the Bloom filter is omitted from the execution plan of the join operation. For example, stages 492-496 may correspond to stage 340 in FIG. 3.

Embodiments shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

FIG. 5 illustrates an example computer system 500 in which embodiments, or portions thereof, may be implemented as computer-readable code. For example, BFCEE 115, including their components, as shown in FIG. 2, can be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 800. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a network interface 524. Network interface 524 allows software and data to be transferred between computer system 500 and external devices. Network interface 524 may include a modem, a network interface (such as an Ethernet card), a communications port, a PCMCIA slot and card, or the like. Software and data transferred via network interface 524 may be in the form of signals, which may be electronic, electromagnetic, optical, or other signals capable of being received by network interface 524. These signals may be provided to network interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via network interface 524. Such computer programs, when executed, enable computer system 500 to implement embodiments as discussed herein. In particular, the computer programs, when executed, enable processor device 504 to implement the processes of embodiments, such as the stages in the methods illustrated by flowcharts 400 and 500 of FIGS. 4 and 5, discussed above. Accordingly, such computer programs represent controllers of the computer system 500. Where embodiments are implemented using software, the software may be stored in a computer program product and loaded into computer system 500 using removable storage drive 514, interface 520, and hard disk drive 512, or network interface 524.

Embodiments also may be directed to computer program products comprising software stored on any computer useable medium. Such software, when executed in one or more data processing device(s), causes a data processing device(s) to operate as described herein. Embodiments employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   building, by a computing device, an execution plan for a join operation having a plurality of levels, including a top level comprising a top join operator, a bottom level comprising a leaf scan operator, and an intermediate level comprising an intermediate operator between the top level and the bottom level;
   determining, by the computing device, a row reduction effect of applying a Bloom filter by simulating a semi-join operation over a table statistic representation at each of the plurality of levels of the execution plan;
   calculating, by the computing device, a cost savings of applying the Bloom filter to the join operation based on the row reduction effect at the each of the plurality of levels; and
   integrating, by the computing device, the Bloom filter to the execution plan upon determining that the cost savings of applying the Bloom filter to the join operation exceeds a joint cost, wherein the joint cost is based on a cost associated with build side and probe side of the Bloom filter.

2. The method of claim 1, wherein the table statistic representation comprises a histogram of data distribution variables on a table involved in the join operation and row count variables associated with the table.

3. The method of claim 1, where the simulating the semi-join operation comprising:
   simulating the semi-join operation between the table statistic representation at the each of the plurality of levels and a build side of an original derived table.

4. The method of claim 3, further comprising:
   generating a new table statistic representation at the each of the plurality of levels, based on corresponding data distribution variables and row count variables.

5. The method of claim 4, further comprising:
   updating the row count variable by adding a false positive rate to the row count variable at the each of the plurality of levels.

6. The method of claim 1, wherein the integrating further comprises:
   integrating the Bloom filter to the execution plan upon determination that a final probing reduced row count is less than 90% of an original scan row count and $$\left(\frac{(c_n - c'_n)}{c_n} > 10\%,\right.$$

wherein Cn is a top join cost associated with the top join operator without applying the Bloom filter, and Cn' is the top join cost after applying the Bloom filter.

7. The method of claim 1, wherein the join operation is an equi-join operation.

8. The method of claim 1, wherein the join operation comprises a hash join, a sort merge join, and a reformatting based nested loop join.

9. A system, comprising:
   a memory; and
   at least one processor coupled to the memory and configured to execute a plurality of modules, the modules comprising:
   a plan builder, configured to build art execution plan for a join operation having a plurality of levels, including a top level comprising a top join operator, a bottom level comprising a leaf scan operator, and an intermediate level comprising an intermediate operator between the top level and the bottom level,
   a operation simulator, configured to determine a row reduction effect of applying a Bloom filter by simulating a semi-join operation over a table statistic representation at each of the plurality of levels of the execution plan;
   a cost calculator, configured to calculate a cost savings of applying the Bloom filter to the join operation based on the row reduction effect at the each of the plurality of levels; and
   a plan integrator, configured to integrate the Bloom filter to the execution plan upon determining that the cost savings of applying the Bloom filter to the join operation exceeds a joint cost, wherein the joint cost is based on a cost associated with build side and probe side of the Bloom filter.

10. The system of claim 9, wherein the table statistic representation comprises a histogram of data distribution variables on a table involved in the join operation and row count variables associated with the table.

11. The system of claim 9, where the operation simulator is further configured to:
    simulate the semi-join operation between the table statistic representation at the each of the plurality of levels and a build side of an original derived table.

12. The system of claim 11, where the operation simulator is further configured to:
    generate a new table statistic representation at the each of the plurality of levels, based on corresponding data distribution variables and row count variables.

13. The system of claim 12, where the operation simulator is further configured to:
update the row count variable by adding a false positive rate to the row count variable at the each of the plurality of levels.

14. The system of claim 9, wherein the plan integrator is further configured to:
integrate the Bloom filter to the execution plan upon determination that a final probing reduced row count is less than 90% of an original scan row count and $$\left(\frac{(c_n - c'_n)}{c_n} > 10\%,\right.$$

wherein Cn is a top join cost associated with the top join operator without applying the Bloom filter, and Cn' is the top join cost after applying the Bloom filter.

15. The system of claim 9, wherein the join operation is an equi-join operation.

16. The system of claim 9, wherein the join operation comprises a hash join, a sort merge join, and a reformatting based nested loop join.

17. A non-transitory computer readable storage medium having instructions encoded thereon, execution of which, by a processor, cause the processor to perform operations comprising:
building, by a computing device, an execution plan for a join operation having a plurality of levels, including a top level comprising a top join operator, a bottom level comprising a leaf scan operator, and an intermediate level comprising an intermediate operator between the top level and the bottom level;
determining, by the computing device, a row reduction effect of applying a Bloom filter by simulating a semi-join operation over a table statistic representation at each of the plurality of levels of the execution plan;
calculating, by the computing device, a cost savings of applying the Bloom filter to the join operation based on the row reduction effect at the each of the plurality of levels; and
integrating, by the computing device, the Bloom filter to the execution plan upon determining that the cost savings of applying the Bloom filter to the join operation exceeds a joint cost, wherein the joint cost is based on a cost associated with build side and probe side of the Bloom filter.

18. A method, comprising:
building, by a computing device, an execution plan for a join operation having a plurality of levels, including a top level comprising a top join operator, a bottom level comprising a leaf scan operator, and an intermediate level comprising an intermediate operator between the top level and the bottom level;
determining, by the computing device, a row reduction effect of applying a Bloom filter by simulating a semi-join operation over a table statistic representation at each of the plurality of levels of the execution plan;
calculating, by the computing device, a cost savings of applying the Bloom filter to the join operation based on the row reduction effect at the each of the plurality of levels; and
discarding, by the computing device, the Bloom filter from the execution plan upon determining that the cost savings of applying the Bloom filter to the join operation does not exceed a joint cost, wherein the joint cost is based on a cost associated with build side and probe side of the Bloom filter.

19. A system, comprising:
a memory; and
at least one processor coupled to the memory and configured to execute a plurality of modules, the modules comprising:
a plan builder, configured to build an execution plan for a join operation having a plurality of levels, including a top level comprising a top join operator, a bottom level comprising a leaf scan operator, and an intermediate level comprising an intermediate operator between the top level and the bottom level,
a operation simulator, configured to determine a row reduction effect of applying a Bloom filter by simulating a semi-join operation over a table statistic representation at each of the plurality of levels of the execution plan;
a cost calculator, configured to calculate a cost savings of applying the Bloom filter to the join operation based on the row reduction effect at the each of the plurality of levels; and
a plan integrator, configured to discard the Bloom filter from the execution plan upon determining that the cost savings of applying the Bloom filter to the join operation does not exceed a joint cost, wherein the joint cost is based on a cost associated with build side and probe side of the Bloom filter.

20. A non-transitory computer readable storage medium having instructions encoded thereon, execution of which, by a processor, cause the processor to perform operations comprising:
building, by a computing device, an execution plan for a join operation having a plurality of levels, including a top level comprising a top join operator, a bottom level comprising a leaf scan operator, and an intermediate level comprising an intermediate operator between the top level and the bottom level;
determining, by the computing device, a row reduction effect of applying a Bloom filter by simulating a semi-join operation over a table statistic representation at each of the plurality of levels of the execution plan;
calculating, by the computing device, a cost savings of applying the Bloom filter to the join operation based on the row reduction effect at the each of the plurality of levels; and
discarding, by the computing device, the Bloom filter from the execution plan upon determining that the cost savings of applying the Bloom filter to the join operation does not exceed a joint cost, wherein the joint cost is based on a cost associated with build side and probe side of the Bloom filter.

* * * * *